United States Patent
Kariya et al.

(10) Patent No.: US 8,088,496 B2
(45) Date of Patent: *Jan. 3, 2012

(54) PISTON RING

(75) Inventors: Tomotaka Kariya, Saitama (JP); Etuo Tamegai, Saitama (JP); Hiromi Ishikawa, Saitama (JP); Makoto Tsuruta, Yokohama (JP)

(73) Assignees: Nippon Piston Co., Ltd, Saitama (JP); STT Inc., Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 12/196,303

(22) Filed: Aug. 22, 2008

(65) Prior Publication Data

US 2009/0051123 A1 Feb. 26, 2009

(30) Foreign Application Priority Data

Aug. 24, 2007 (JP) ................. P2007-218664
Jul. 25, 2008 (JP) ................. P2008-191764

(51) Int. Cl.
| | |
|---|---|
| *B32B 3/02* | (2006.01) |
| *B32B 3/10* | (2006.01) |
| *B32B 15/04* | (2006.01) |
| *B32B 15/08* | (2006.01) |
| *B32B 15/088* | (2006.01) |
| *F16J 9/26* | (2006.01) |

(52) U.S. Cl. ........ 428/626; 428/66.4; 428/458; 277/442
(58) Field of Classification Search ................. 428/624, 428/626, 458, 474.4, 473.5, 66.4, 66.6
See application file for complete search history.

(56) References Cited

U.S. PATENT DOCUMENTS

| | | | | |
|---|---|---|---|---|
| 4,868,067 A | * | 9/1989 | Fujisawa et al. | 428/614 |
| 2004/0166341 A1 | * | 8/2004 | Iwata et al. | 428/473.5 |
| 2009/0058014 A1 | * | 3/2009 | Kariya et al. | 277/442 |

FOREIGN PATENT DOCUMENTS

| | | | |
|---|---|---|---|
| JP | 7-63266 | | 3/1995 |
| JP | 10-246149 | | 9/1998 |
| JP | 11-246823 | | 9/1999 |
| WO | WO 2007/099968 | * | 9/2007 |

OTHER PUBLICATIONS

Machine Translation, Ichimura et al. JP10-246149, Sep. 1998.*

* cited by examiner

*Primary Examiner* — Michael Lavilla
(74) *Attorney, Agent, or Firm* — Young & Thompson

(57) ABSTRACT

A piston ring includes a piston ring body and a surface coating film formed on at least one of upper and lower surfaces of the piston ring body. The surface coating film has a most outside surface layer including a heat-resistant resin and a metal powder contained in the heat-resistant resin and a base bottom layer formed nearest the piston ring body and including a heat-resistant resin. The base bottom layer may also include a metal powder.

3 Claims, 10 Drawing Sheets

PISTON RING

BACKGROUND OF THE INVENTION

1. Field of the Invention

The present invention relates to a piston ring utilized for an internal combustion engine, and more particularly, relates to a piston ring capable of effectively preventing adhesion (deposition) of aluminum to a piston ring.

2. Related Art

Generally, a compression ring and an oil ring are mounted as set of a piston ring to a piston that performs reciprocating motion. The compression ring has a function of preventing a blow-by phenomenon in which highly pressurized combustion gas is blown out from a combustion chamber side to a crank chamber side. On the other hand, the oil ring is used for mainly achieving a function of suppressing an oil-up phenomenon in which an excessive lubricant adhering on a cylinder inner wall surface invades into the combustion chamber side from the crank chamber side and then is consumed. In a conventional standard combination of the piston ring, there is well known a combination of three rings comprising two compression ring including a one top ring and a second ring and one oil ring.

In recent, according to an increasing tendency of light weight and high outputting of an internal combustion engine, it has been highly required for a piston ring to have a highly improved quality. In a conventional technology for improving durability of the piston ring of the internal combustion engine, wear resistance surface treatment such as nitriding treatment, ion plating treatment, or hard chromium plating treatment has been proposed.

In these surface treatments, the nitriding treatment has been highly evaluated and widely used as surface treatment for the piston ring, which is utilized under harsh operating conditions, because the nitriding treatment provides an excellent wear resistance performance.

However, although the piston ring subjected to the nitriding treatment is excellent in the wear resistance, when it is applied to a piston made of an aluminum alloy, wear of a ring groove of the piston tends to be increased. In addition, as shown in FIGS. 1A to 1C, a phenomenon of adhering aluminum to a lower surface 3 of a piston ring 1 from a lower surface of a groove of a piston made of aluminum alloy has been caused (see FIG. 1C).

FIG. 2A to 2C are charts showing change of surface conditions of upper and lower surfaces 2 and 3 of the ring groove of the piston carried out by using a contact stylus surface-roughness testing machine. As shown in FIG. 2, the surface conditions of the upper and lower surfaces 2 and 3 of the piston ring groove changes from a normal condition shown in FIG. 2A to an aluminum adhesion condition shown in FIG. 2C through a piston groove rough condition 2B.

In FIGS. 2A to 2C, the axis of abscissa represents a position of the piston and the axis of ordinate represents waviness of the piston groove, and in these figures, letter F denotes a front direction, AT denotes anti-thrust direction, R denotes rear direction and T denotes thrust direction.

Furthermore, FIGS. 3A to 3C show aluminum adhesion mechanism, in which FIG. 3A shows a state that the lower surface 3 of the piston ring 1 and a groove lower surface 11 of an aluminum alloy piston 10 contact each other through oxide films 8, each having thickness of less than 0.2 μm, formed on both the surfaces, FIG. 3B shows a state that a stress of the contacting oxide films 8 becomes locally high, which destroys the oxide films 8, and Fe on the lower surface 3 of the piston ring 1 and Al on the groove lower surface 11 of the aluminum alloy piston 10 are joined, and FIG. 3C shows a state that an aluminum alloy 20 is fused to the lower surface 3 of the piston ring 1.

Further, FIG. 4 shows an enlarged view of the aluminum adhering portion, and in FIG. 4, reference numeral 20 denotes the adhering aluminum and reference numeral 21 denotes a joined portion of the Al and Fe.

As mentioned above, according to vertical motion of the piston ring, when local wear resulted from this welding phenomenon occurs to a predetermined portion of the piston groove, sealing performance of the internal combustion engine is degraded by the blow-by of a blow-by gas, and hence, an output is reduced. This phenomenon occurs for a short time on the lower side of the piston ring groove and largely affects on the durability of the internal combustion engine. Accordingly, there have been conventionally proposed countermeasures to wear of the piston groove.

For example, as the countermeasure to the wear of the piston groove, in order to prevent the piston and the piston ring from directly contacting each other, the piston is subjected to anode oxidation film coating treatment, plating treatment or matrix strengthening treatment in the piston, and on the other hand, the piston ring is subjected to phosphor salt film coating treatment or plating treatment, or as shown in FIGS. 5A and 5B, resin coating treatment is applied to the surfaces of the piston 10 and piston ring 1 (for example, Defric (made by KAWAMURA KENKYU-SHO) coating treatment.

Furthermore, in order to solve the above problem, there has been developed and provided a piston ring in which a wear resistance treated layer such as nitride layer or chromium plating layer is formed to the upper and lower surfaces, or only lower surface of the piston ring, and a polybenzimidazole resin film containing solid lubricant is formed on a surface of the wear resistance treated layer (see Patent Publication 1: Japanese Patent Application Laid-open Publication No. HEI 7-063266)

Moreover, there have also been developed and provided, by persons other than the applicant of the subject application, a piston ring having a surface which is coated with an heat-resistant resin containing a solid lubricant (see Patent Publications 2 and 3: Japanese Patent Application Laid-open Publication Nos. HEI 10-246149 and HEI 11-246823)

However, the above-mentioned countermeasures to the wear of the piston groove in the conventional technology may be effective for preventing adhesion of aluminum in an initial stage of the using of the piston, but are insufficient for a long term use of the piston, thus requiring improvement of durability.

More specifically, for example, although the above Patent Publication 1 discloses a surface coating film composed of polybenzimidazole resin and solid lubricant (graphite or $MoS_2$) The polybenzimidazole resin is liable to be oxidized in its liquid resin at the formation of the coating film and is deteriorated with age. Thus, it is necessary to pay attention to use. In addition, the polybenzimidazole is sometime difficult to stably maintain its quality for a long time.

Furthermore, the above Patent Publication 2 discloses a surface coating film composed of polyamideimide resin or polyimide resin and a solid lubricant (graphite, $MoS_2$, $WS_2$ or polytetrafluoroetylene). However, such surface coating film does not sufficiently prevent an aluminum adhesion and also involves cost increasing problem.

Still further more, the above Patent Publication 3 discloses a surface coating film composed of polyamideimide resin or polyimide resin and a solid lubricant such as $MoS_2$ or $Sb_2O_3$. However, such coating film cannot sufficiently prevent the adhesion of aluminum, and $Sb_2O_3$ is harmful for environment, thus being difficult to use.

SUMMARY OF THE INVENTION

In a conventional technology of preventing wear of a piston ring groove, i.e., preventing aluminium adhesion, a surface coating film containing a solid lubricant is applied to the piston ring surface so as to endow the surface lubricity to the surface of the piston ring body. On the contrary, in the present invention, the surface coating film contains the metal powder rather than the solid lubricant.

As mentioned, in the conventional technology, it was aimed to improve the lubricating ability (lubricity) of the piston ring surface to make reduce the wear of the piston ring groove. This aim may be achieved by endowing the piston ring surface with the lubricity. However, in such measure, there may be no problem at the initial stage at which the surface coating film having lubricating ability sufficiently exists, but after long time passes, the surface coating film itself may be worn and peeled off, resulting in loss of lubricating ability, and the piston ring body surface may be exposed and the piston ring groove may be worn.

The present invention was conceived in consideration of the circumstances mentioned above and an object thereof is to provide a piston ring capable of improving wear resistance property, effectively preventing aluminium adhesion phenomenon to a piston ring and effectively preventing peeling of a surface coating film from a piston ring body.

The above and other objects can be achieved according to the present invention by providing, in one aspect, a piston ring including a piston ring body and a surface coating film formed on at least one of upper and lower surfaces of the piston ring body, wherein the surface coating film comprises a most outside surface layer including a heat-resistant resin and a metal powder contained in the heat-resistant resin and a base bottom layer formed close to the piston ring body and including a heat-resistant resin.

In another aspect of the present invention, there is also provided a piston ring including a piston ring body and a surface coating film formed on at least one of upper and lower surfaces of the piston ring body, wherein the surface coating film comprises a most outside surface layer including a heat-resistant resin and a metal powder contained in the heat-resistant resin and a base bottom layer formed close to the piston ring body and including a heat-resistant resin and a metal powder contained in the heat-resistant resin, in which the base bottom layer includes a metal powder containing rate not more than that contained in the most outside surface layer.

In the above aspect, it may be desired that the metal powder is a powder selected from a group consisting of copper system powder, nickel powder, nickel alloy powder, lead system powder, tin system powder or silicon system powder.

It may be desired that the heat-resistant resins forming the base bottom layer and the most outside surface layer further include a self-lubricating metal. The self-lubricating metal may be either one of molybdenum disulfide, tungsten disulfide or graphite. It is desirable that the containing rate of the metal powder contained in the base bottom layer is not more than 40 mass %, and the containing rate of the self-lubricating metal is not more than 5 mass %, and that the containing rate of the metal powder contained in the most outside surface layer is 40 to 80 mass %, and the containing rate of the self-lubricating metal is 2 to 10 mass %.

It may be also desired that each of the metal powder and the self-lubricating metal contained in the base bottom layer has an average particle diameter of not more than 5 μm, and each of the metal powder and the self-lubricating metal contained in the most outside surface layer has an average particle diameter of 5 to 40 μm.

The heat-resistant resin may be polyamideimide resin or polyimide resin.

According to the first aspect of the present invention mentioned above, by forming the most outside surface layer composed of the heat-resistant resin and the metal powder contained in the heat-resistant resin on at least one of the upper and lower surfaces of the piston ring body, the surface coating film is endowed with the wear resistance performance, and in addition, a portion of an aluminum alloy piston ring groove can be prevented from peeling off and adhering to the piston ring. Furthermore, by strong tight of the most outside surface layer to the piston ring base metal through the base bottom layer formed of the heat-resistant resin, the surface coating film can be prevented from peeling off from the piston ring body.

Furthermore, according to the second aspect of the present invention mentioned above, the base bottom layer includes a metal powder containing rate not more than that contained in the most outside surface layer, so that the tight adhesiveness of the piston ring body and the surface coating film can be effectively maintained and the peeling-off of the surface coating film from the piston ring body can be prevented. Moreover, even in a case where the most outside surface layer is vanished by the wear and the base bottom layer is exposed outside, the wear resistance of the surface coating film can be maintained by the wear resistance performance of the base bottom layer.

According to the present invention, as mentioned above, since the most outside surface layer forming the surface coating film includes the heat-resistant resin, the surface of the piston ring is endowed with the lubricity, and in addition, the most outside surface layer also includes the metal powder, the surface coating film formed on the piston ring surface is endowed with the wear resistance performance. The base bottom layer is endowed with the adhesiveness by the heat-resistant resin included in the base bottom layer forming the surface coating film, so that the initial wear can be suppressed and the wear resistance can be maintained for a long time to thereby prevent the surface coating film from peeling off from the piston ring body, thus being advantageous.

The nature and further characteristic features of the present invention will be made clearer from the following descriptions made with reference to the accompanying drawings.

BRIEF DESCRIPTION OF THE DRAWINGS

In the accompanying drawings:

FIG. 1 includes views showing aluminium adhesion phenomenon, in which

DESCRIPTION OF THE PREFERRED EMBODIMENT

A first embodiment of a piston ring according to the present invention will be described hereunder with reference to FIGS. 6 and 7.

Figure 1A:
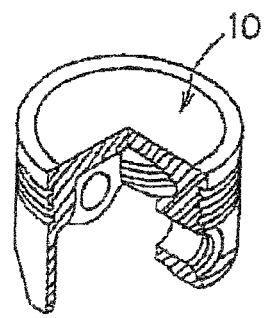
FIG. 1A is a perspective view, partially cut away, of a piston.
Figure 1B:
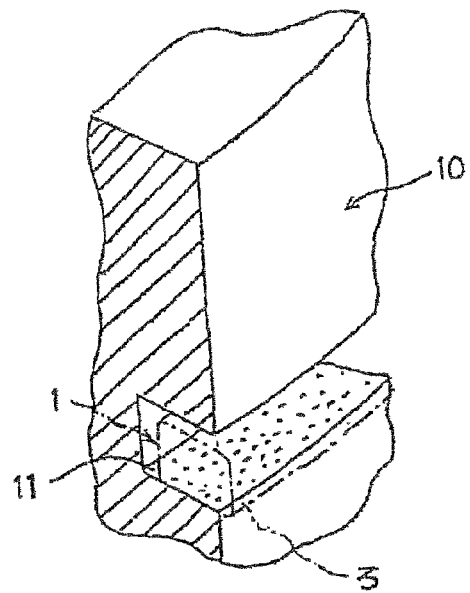
FIG. 1B is an enlarged perspective view partially showing a piston ring and piston ring groove.
Figure 1C:
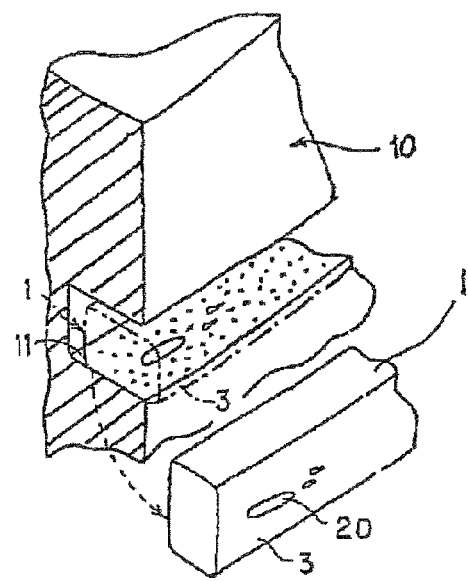
FIG. 1C is an enlarged perspective view partially showing an aluminium adhesion to the piston ring.
Figure 2A:
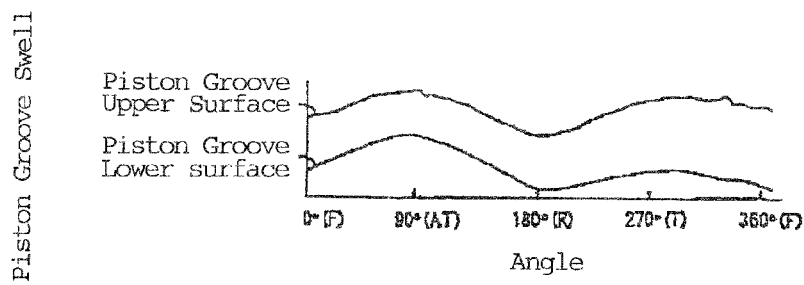
FIG. 2 includes FIGS. 2A, 2B and 2C, which shows changes in surface conditions of upper and lower surfaces of the piston ring groove.
Figure 2B:
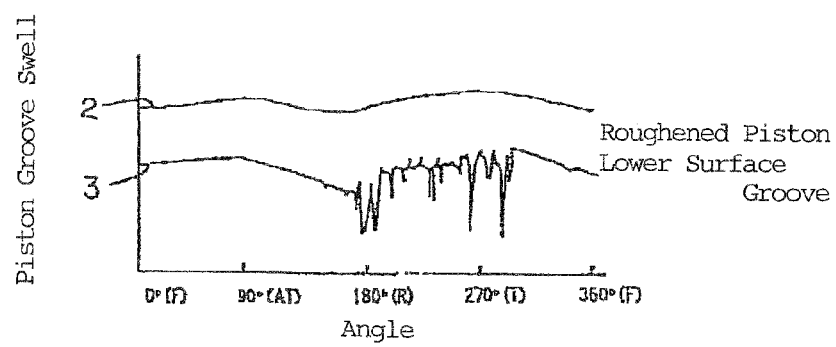
Figure 2C:
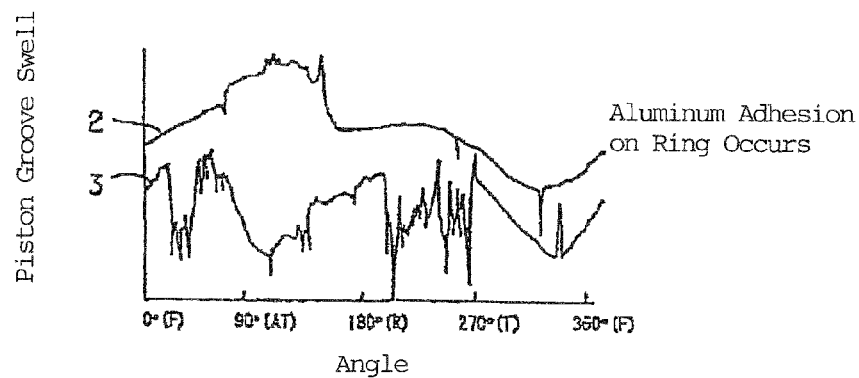
Figure 3A:
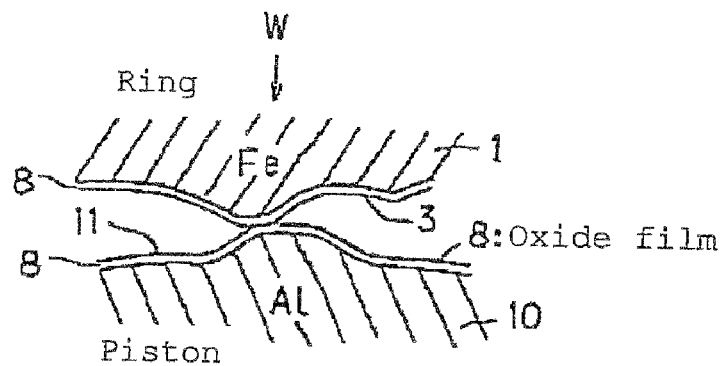
FIG. 3 includes FIGS. 3A, 3B and 3C illustrating sectional views showing aluminium adhesion mechanism.
Figure 3B:
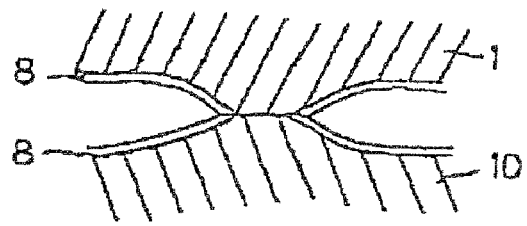
Figure 3C:
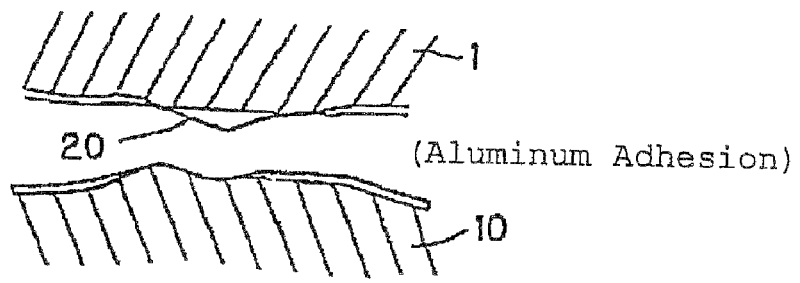
Figure 4:
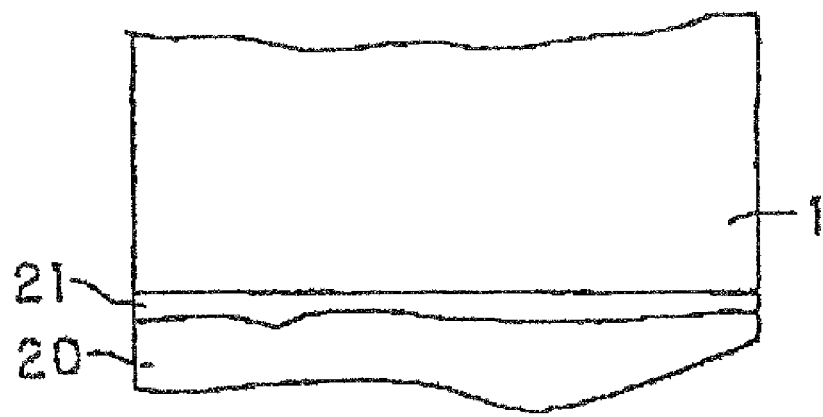
FIG. 4 is an enlarged view showing the adhesion part of aluminium.
Figure 5A:
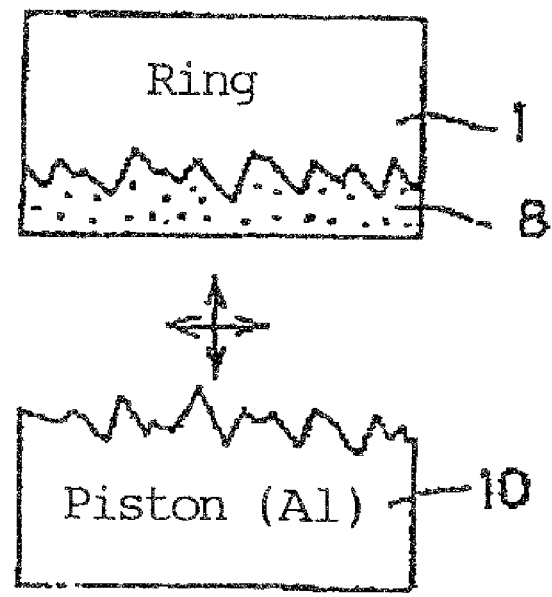
FIG. 5 includes FIGS. 5A and 5B illustrating sectional views showing a conventional resin coating treatment.
Figure 5B:
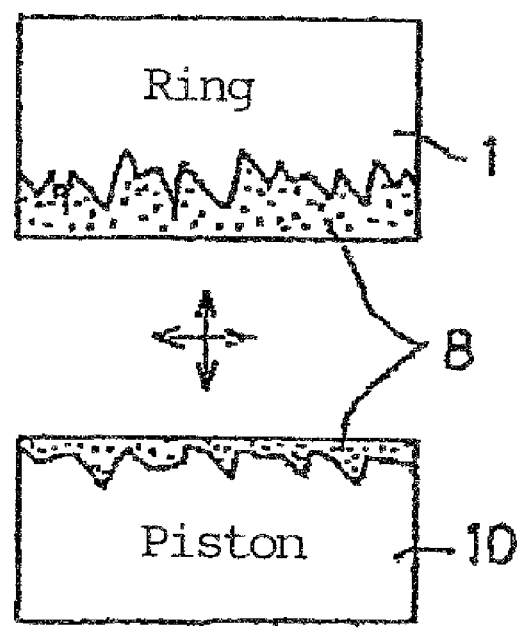
Figure 6:
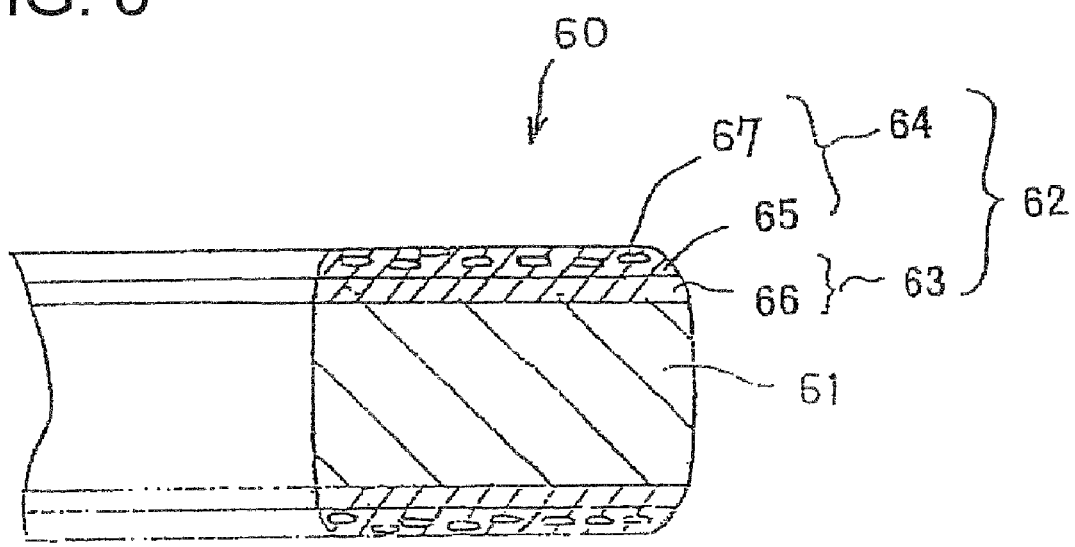
FIG. 6 is a sectional view showing a piston ring according to a first embodiment of the present invention.

With reference to FIG. 6, a piston ring 60 of the present embodiment is provided with a piston ring body 61 and a surface coating film 62 formed on at least one of upper and lower surfaces of the piston ring body 61 (both surfaces in FIG. 6). The surface coating film 62 is disposed to a portion most apart from the piston ring body 61 on the sliding surface side, and is composed of a most outside surface layer 64 including a heat-resistant resin 65 and a metal powder 67 contained in the heat-resistant resin 65 and a base bottom (most inside) layer 63 disposed most near the piston ring body 61 and composed of a heat-resistant resin 66.

The piston ring body 61 of the present invention is not specifically limited in its material and every material may be usable. For example, steel (steel material) may be preferably utilized, and as a stainless steel, SUS440, SUS410, SUS304 or like, or 8Cr steel, 10Cr steel, SWOSC-V, or SWRH material may be utilized. The piston ring may be utilized as a top ring functioning as a so-called compression ring as well as second ring, and moreover, according to the present invention, the piston ring may be applicable to an oil ring.

The most outside surface layer 64 is disposed for improving the wear resistance of the surface coating film 62 and preventing the aluminium adhesion phenomenon to the piston ring. The most outside surface layer 64 is composed of the heat-resistant resin 65 and the metal powders 67 contained in the heat-resistant resin 65.

The heat-resistant resin 65 forming the most outside surface layer 64 is provided mainly for giving lubricity (lubricating ability) to the surface of the piston ring. On the other hand, the metal powder (metal powder particles) 67 is provided for giving the wear resistance performance to the most outside surface layer 64 forming the surface coating film 62 so as to keep the lubricity of the heat-resistant resin 65 for a long time.

The heat-resistant resin 65 forming the most outside surface layer 64 is not limited in its material of resin, as far as it can withstand an environment (temperature) using the piston ring 60, has a lubricity and can fixedly hold the metal powder 67. More specifically, polyamideimide (PAI) or polyimide (PI) may be listed up as a preferable material.

The metal powder 67 is provided for the purpose of imparting the wear resistance property to the surface coating film 62 containing such metal powder 67. The metal powder 67 is not limited in its material as far as it achieves the above purpose.

However, in the present invention, although it is necessary for the metal powder 67 to prevent the heat-resistant resin from wearing, it should be avoided for the metal powder 67 to attack the piston ring groove as a target material, and in such viewpoint, it may be preferable as a material of the metal powder 67 to use copper group (Cu) powder, nickel (Ni) powder, nickel alloy powder, lead group (Pb) powder, tin group (Sn) powder or silica group (Si) powder.

The metal powder 67 is also not limited in its shapes and there may be adopted a stable shape such as squama shape, spherical shape or polygonal shape, or indeterminate form shape. However, since it is necessary to prevent the metal powder 67 from attacking to the piston ring groove as a opposite material, and in such viewpoint, the polygonal shape is not preferred, and squama shape shown in FIG. 7 or spherical shape, not shown, may be preferred. By adopting the squama-shaped or spherical shaped metal powders and arranging them in the thickness direction of the surface coating film as shown in FIG. 7, the piston ring groove can be prevented from being damaged.

In the case of the metal powder 67 having the squama shape or spherical shape, the size thereof is not specifically limited, but it may be preferred for the metal powder to have an average particle diameter of 5 to 40 μm. By setting the diameter in this range, the wear resistance performance of the most outside surface layer 64 may be further improved. Further, it is to be noted that the particle diameter of the metal powder 67 is a length "r" shown in FIG. 7B, which means the length in the longitudinal direction of squama-shaped piece.

With the most outside surface layer 64 constituting the surface coating film 62 of the present invention, containing rate of the metal powders 67 with respect to the heat-resistant resin 65 may be set at a balance of an extent that the heat-resistant resin 65 can achieve the lubricity, and the metal powders 67 can achieve the wear resistance performance. More specifically, it may be desirable to set the containing rate of the metal powders 67 to 40 to 80 mass percent (%), and more preferably, to 50 to 60 mass %. In the case of less than 40 mass % of the metal powders 67, the reduction or vanishing of the surface coating film due to wear cannot be sufficiently prevented, and on the other hand, in the case of more than 80 mass %, flexibility of the surface coating film is entirely lowered, and it becomes difficult to fix the metal powders 67 with the heat-resistant resin 65, which may result in separation of the metal powders 67.

Further, it is preferred that an area ratio (see FIG. 7B), which is occupied by the metal powders 67, in the most outside surface layer 64 constituting the piston ring according to the present invention, is in a range of 6 to 74%. In such area ratio of the metal powders 67, the heat-resistant resin 65 and the metal powders 67 can maintain good balance and achieve their advantageous effects sufficiently.

Figure 8:
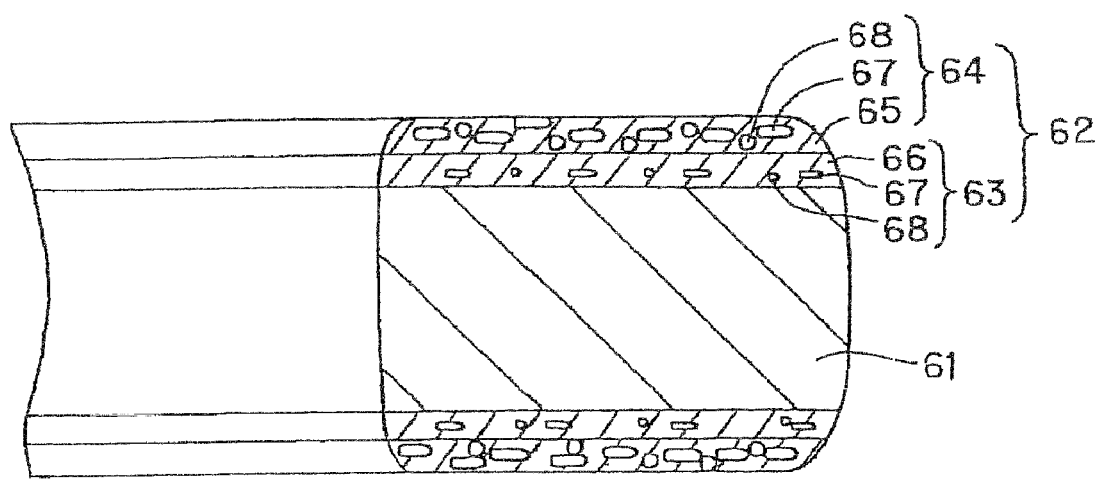
FIG. 8 is a sectional view showing a piston ring according to a second embodiment of the present invention.

As shown in FIG. 8, it is preferred that the heat-resistant resin 65 includes self-lubricating metal 68 in a uniformly dispersed fashion. It may be preferred that such self-lubricating metal 68 is either one of molybdenum disulfide, tungsten disulfide or graphite. As mentioned, by adding the self-lubricating metal 68, initial running-in of the aluminium adhesion may be increased As a specific containing ratio, it is desirable to set the containing ratio of the self-lubricating metal 68 to 2 to 10 mass %, and more preferably, to 3 to 5 mass %. (In this case, when the containing amount of the metal powders 67 formed of predetermined material is 40 to 80 mass %, the residual is the heat-resistant resin 65). By forming the surface coating films 62 including the metal powders 67 of predetermined material and the self-lubricating metal 68 on the upper and lower surfaces of the piston ring, the initial conformability to the piston material made of aluminium and the wear resistance performance can be improved. As a result, the aluminium adhesion can be prevented from causing, and hence, the piston ring having improved durability can be provided.

Further, as the self-lubricating metal 68, there may be also provided, in addition to those mentioned above, tungsten selenide, molybdenum selenide, boron nitride, or fluororesin (polytetrafluoroetylene), which may achieve substantially the same effects as those mentioned above.

The base bottom (most inside) layer 63 is disposed for the purpose of imparting the tight property of the most outside surface layer 64 with the piston ring body 61 and preventing the surface coating film 62 from peeling off from the piston ring.

The heat-resistant resin 65 forming the base bottom layer 65 is used for imparting the tight property to the base bottom layer, and as far as the above-mentioned effects are achieved, a substance of a heat-resistant resin 66 forming a base bottom layer 63 is not specifically limited and a conventionally known material may be selectively used. More specifically, polyamideimide (PAZ) resin or polyamide (PI) resin may be listed up. Since the base bottom layer 63 formed of such resin and the piston ring body 61 and the most outside surface layer 64 has high tight property, the tight property between the piston ring body 61 and the most outside surface 64 is enhanced and the peeling-off of the surface coating film 62 from the piston ring can be prevented.

In the present invention, a formation method of the surface coating film 62 is not specifically limited, and for example, there may be provided a method in which the heat-resistant resin 66 is coated on the surface of the piston ring body 61, by spray coating method, a immersion coating method or electrostatic painting method, to thereby form the base bottom layer 63, and then, the heat-resistant resin 65 containing the metal powders 67 is coated on the surface of the base bottom layer 63. Further, the surface coating film 62 may be heated-baking, as post-processing, by heating as occasion demands.

It is desirable that the most outside surface layer 64 formed in the described manner has a thickness of about 5.0 to 11.0 µm, and the base bottom layer 63 has a thickness of about 0.1 to 2.0 µm.

By forming the most outside surface layer 64 and the base bottom layer 63 so as to have the thickness mentioned above, the tight property of the base bottom layer 63 and the mother material can be improved and the suitable wear resistance performance at the most outside surface layer 64 can be maintained.

As mentioned hereinabove, according to the first embodiment of the present invention, since the surface coating film 62 includes the most outside surface layer 64 and the base bottom layer (inside surface layer) 63, the wear resistance performance of the surface coating film 62 can be improved by the most outside surface layer 64 to thereby prevent the piston ring from aluminium adhesion, and in addition, the peeling-off of the surface coating film 62 from the piston ring can be prevented by the base bottom layer 63.

A second embodiment of the present invention will be described hereunder with reference to FIGS. 8 and 9.

Figure 9A:
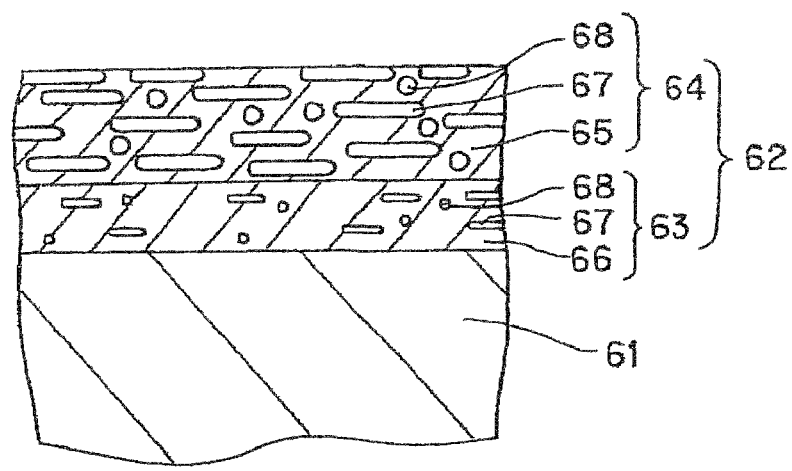
FIG. 9 includes FIG. 9A showing an enlarged sectional view of a portion near the surface coating film of the piston ring shown in FIG. 8, FIG. 9B showing an enlarged front view of the surface of the most outside surface layer of the piston ring shown in FIG. 8, and FIG. 9C showing a surface of a base bottom layer (most inside surface layer) of the piston ring shown in FIG. 8.
Figure 9B:
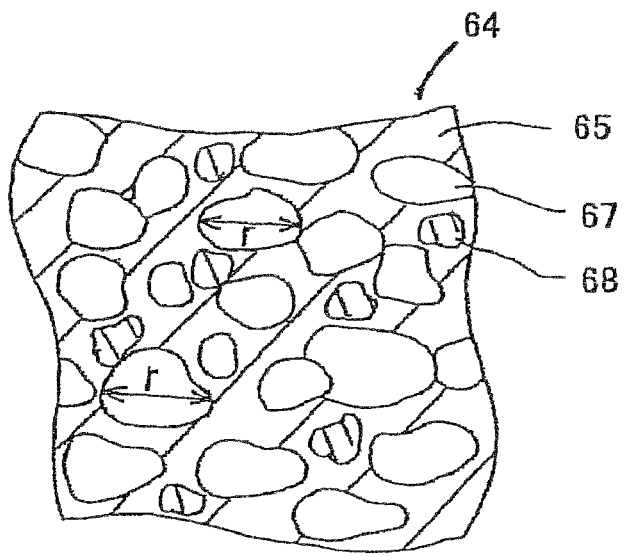
Figure 9C:
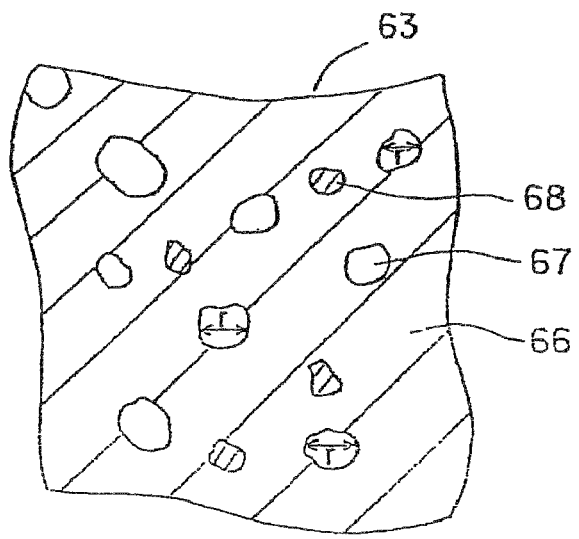

With reference to FIGS. 8 and 9, the present invention of this second embodiment is an invention which is characterized in that the containing rate of the metal powders 67 contained in the base bottom layer 63 is smaller than that of the metal powders 67 contained in the most outside surface layer 64. Further, the heat-resistant resin 66 forming the most outside surface layer 64 and the base bottom layer 63 is the same as that shown in FIGS. 6 and 7, so that the duplicated descriptions are omitted herein.

When the metal powder 67 contained in the base bottom layer 63 is subsided, the adhesion performance between the base bottom layer 63 and the piston ring body 61 is degraded, and accordingly, it is desired that the containing rate of the metal powders 67 contained in the base bottom layer 63 is smaller than that of the metal powders 67 contained in the most outside surface layer 64.

As mentioned above, by reducing the containing rate of the metal powders 67 in the base bottom layer 63, the tight performance between the piston ring body 61 and the base bottom layer 63 and between the most outside surface layer 64 and the base bottom layer 63 can be improved by the effect of the heat-resistant resin 66 applying the tight performance, and the peeling-off of the surface coating film 62 from the piston ring can be effectively prevented. Further, by increasing the containing rate of the metal powders 67 in the most outside surface layer 64, the wear resistance performance of the surface coating film 62 can be maintained. In addition, the base bottom layer 63 can itself provide the wear resistance by the metal powders 67 contained in the base bottom layer 64, even if the most outside surface layer 64 is vanished by the wear, a constant wear resistance performance can be attained in comparison with the base bottom layer 63 including no metal powder.

Figure 7A:
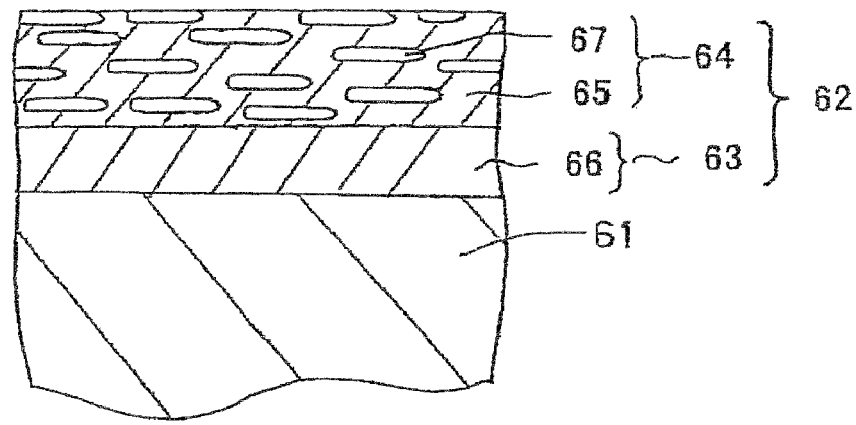
FIG. 7 includes FIG. 7A showing an enlarged sectional view of a portion near the surface coating film of the piston ring shown in FIG. 6 and also includes FIG. 7B showing an enlarged front view of the surface of the most outside surface layer of the piston ring shown in FIG. 6.
Figure 7B:
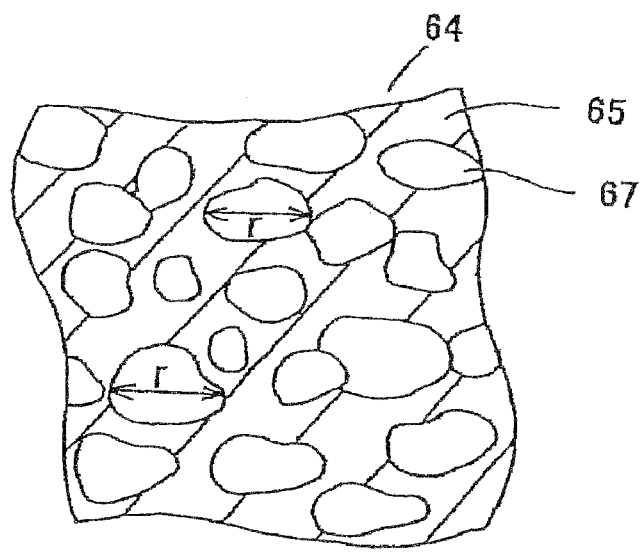

As the metal powder 67 contained in the heat-resistant resin 66 forming the base bottom layer 63, there may be listed up, as like as the metal powder 67 contained in the most outside surface layer 64, copper (Cu) group powder, nickel (Ni) powder, nickel alloy powder, lead (Pb) group powder, tin (Sn) group powder and silica (Si) group powder, and the shape and surface area of the metal powder 67 correspond to those mentioned with respect to FIGS. 6 and 7.

In the base bottom layer 63 forming the surface coating film 62 of the present invention, the containing rate of the metal powders 67 with respect to the heat-resistant resin 66 may be preferably set in a balance to the extent of achieving the adhesive performance of the heat-resistant resin 66 to the piston ring body 61 and the most outside surface layer 64 and also achieving the wear resistance performance of the metal powder 67. However, it is necessary for the base bottom layer to join the piston ring body and the most outside layer, and in consideration of this matter, it is preferred that the containing amount of the metal powders 67 of the base bottom layer 63 is smaller than that of the metal powders 67 of the most outside surface layer 64, and it is more preferred that the containing amount of the metal powders 67 contained in the base bottom layer 63 is less than 40 mass % of the entire base bottom layer 63. In the case of more than 40 mass %, the containing amount of the resin component in the base bottom layer 63 is reduced, and accordingly, the tight performance of the base bottom layer 63 is degraded, resulting in less performance of preventing the surface coating film 62 from peeling off from the piston ring, and in a certain case, the surface coating film 62 may be peeled off therefrom.

Furthermore, it is preferred that the self-lubricating metal 68 shown in FIG. 8 or 9 is contained in the heat-resistant resin forming the base bottom layer 63 in a uniformly dispersed manner. As such self-lubricating metal, molybdenum disulfide, tungsten disulfide, or graphite may be desired as like as the self-lubricating metal 68 contained in the most outer surface layer 64 as mentioned hereinbefore. By adding the self-lubricating metal 68, the initial running-in of the aluminium adhesion may be improved.

In order to prevent the self-lubricating metal 68 of the base bottom layer 63 from precipitating in the piston ring body 61 and prevent the tight performance of the base bottom layer 63 form lowering, it is desirable to make the containing rate of the self-lubricating metal 68 smaller than the containing rate of the self-lubricating metal 68 of the most outside surface layer 64, and more preferably, to make the containing amount of the self-lubricating metal 68 with respect to the entire base bottom layer 63 less than 5 mass %. (In this case, when the containing amount of the metal powders 67 made of predetermined material is less than 40 mass %, the remaining portion is heat-resistant resin 66.) In the case of the containing rate of more than 5 mass % of the self-lubricating metal, the initial conformability to piston material formed of the aluminium material and the wear resistance performance can be increased, but the tight performance of the base bottom layer may be degraded.

As mentioned above, by forming the base bottom layer 63, which contains the self-lubricating metal 68 in addition to the metal powders 67 formed of predetermined material, to each of the upper and lower surfaces of the piston ring, even in the case when the most outside surface layer is vanished, the initial conformability to the piston material formed of the aluminium material and the wear resistance performance can be suitably maintained, and in addition, by containing the metal powders 67 and the self-lubricating metal 68 in the base bottom layer 63 in an amount less than that in the most outside surface layer 64, the containing amount of the heat-resistant resin 66 for imparting the tight performance can be maintained. As a result, it becomes possible to provide a piston ring capable of preventing the aluminium adhesion from causing, imparting excellent durability and preventing the surface coating film 62 from peeling off.

Further, as the self-lubricating metal, in addition to those mentioned above, tungsten selenide, molybdenum selenide, boron nitride, fluororesin(polytetrafluoroethylene) or like may be utilized, and by using such materials, substantially the same effects may be achieved.

From the reason that when the average particle diameter of the metal powder 67 and the self-lubricant metal 68 contained in the base bottom layer 63 becomes large, the tight performance is degraded, it is preferred that this average particle diameter is smaller than that of the metal powder 67 and the self-lubricating metal 68 in the most outside surface layer 64. In the case where the average particle diameter is more than 5 µm, the tight performance of the base bottom layer is extremely lowered, so that it is desirable that the average particle diameter of the metal powder 67 and the self-lubricant metal 68 contained in the base bottom layer 63 is less than 5 µm. As mentioned, by making the average particle diameter less than 5 µm, the tight performance of the base bottom layer can be improved and the tight performance of the piston ring body 61 to the surface coating film 62 can be further improved.

As mentioned, according to the second embodiment of the present invention, constant effect can be achieved with respect to the wear resistance performance of the base bottom layer 63 by containing the metal powder 67 to the base bottom layer 63, and even in an occasion when the most outside surface layer 64 is vanished, the wear resistance performance of the surface coating film 62 can be effectively maintained.

In addition, by making the containing amount of the metal powder 67 in the base bottom layer 63 smaller than that contained in the most outside surface layer 64, the tight performance of the base bottom layer 63 can be maintained and the surface coating film 62 can be prevented form peeling off from the piston ring.

Furthermore, the tight performance of the base bottom layer 63 and the wear resistance performance of the most outside surface layer 64 can be further improved by making the average particle diameter of the metal powder 67 and the self-lubricating metal 68 contained in the base bottom layer 63 smaller than those contained in the most outside surface layer 64.

The piston ring of the present invention will be more specifically mentioned hereunder with reference to preferred examples.

Hereunder, the Examples 1-29 according to the present invention and the Comparative Examples 1-6 are described.

A member corresponding to the piston ring body was prepared by using a material corresponding to JIS SWOSC-V. The piston ring has the following dimensions of outer diameter: 71 mm, width in ring diameter direction (a1): 2.55 mm, width in ring axis direction (h1): 1.2 mm, and the JIS SWOSC-V material has composition of C: 0.55 mass %, Si: 1.4 mass %, Mn: 0.6 mass %, P: 0.02 mass %, S: 0.02 mass %, Cr: 0.65 mass %, Cu: 0.08 mass %, and residual: F and unavoidable impurity.

Copper (Cu) system powders as metal powder and molybdenum disulfide as self-lubricating metal were contained in polyamideimide resin as heat-resistant resin, and this material was sprayed on both surface of upper and lower surfaces of the member mentioned above so as to form a base bottom layer having thickness of 2.0 µm. Then, a most outside surface layer was formed on the base bottom layer by spraying the same material as that sprayed for forming the base bottom layer so as to provide the thickness of 8.0 µm. Further, average grain diameter of the metal powders, and containing rates of the metal powders and the self-lubricating metal with respect to the entire base bottom layer and the most outside surface layer are shown in the following Table 1.

A Comparative Example does not include copper group powder, and is composed of a most outside surface layer prepared by containing molybdenum disulfide (2 mass %) to polyamideimide resin and a base bottom layer prepared by containing copper group powder (20 mass %) and molybdenum disulfide (2 mass %) to polyamideimide resin. The thus prepared most outside surface layer and the base bottom layer were used as test pieces for attack test with sliding, and after the attack test with sliding, wear amounts of respective test pieces were calculated with piston material wear amount and piston ring material wear amount, both being made as 100.

The thus formed piston ring test pieces were made as Examples 1-29 and Comparative Examples 1-6 as shown in the Table 1.

Attack tests with sliding were carried out to all the test pieces of the Examples 1-29 and Comparative Examples 1-6.

[Attack Test with Sliding]

Figure 10:
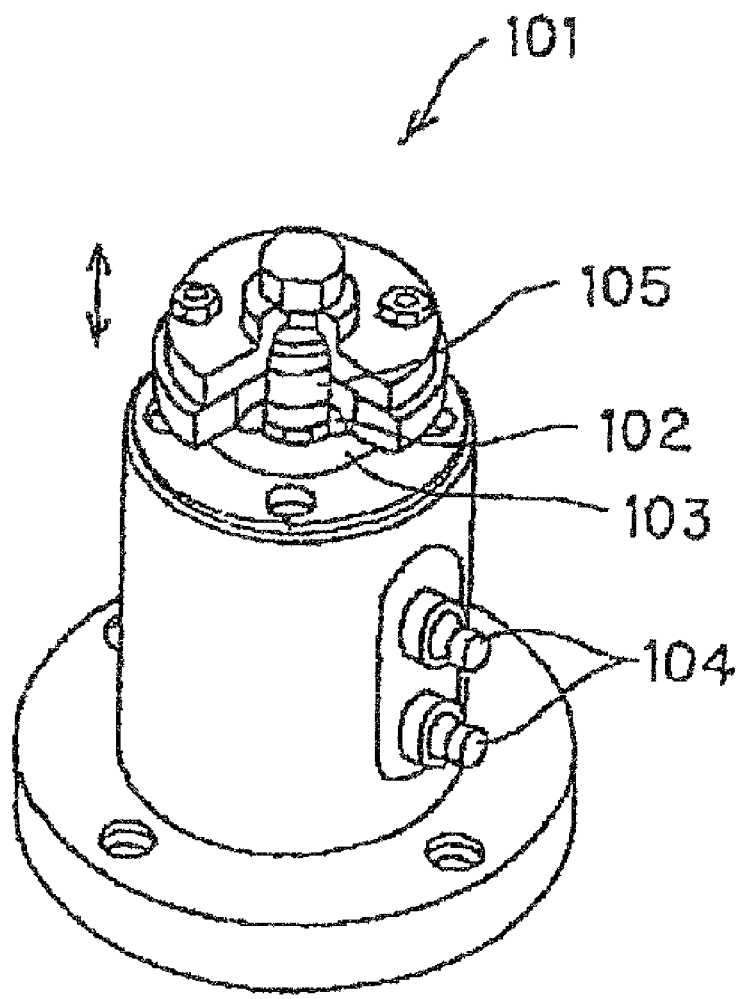
FIG. 10 is a view showing a high temperature valve seat wear test device.

This test was carried out by using a high temperature valve seat wear test device 101 shown in FIG. 10 with testing conditions of stroke: 4 mm; repeating speed: 500 numbers/min.; ring revolution speed: 3 rpm; testing time: 7 hours; piston temperature: about 250° C.; and material of piston: aluminium alloy (AC8A).

The attack test with sliding is a test performed by fixing a piston material 103 with respect to the testing machine 101 in a manner immovable in an axial direction thereof, mounting concentrically a piston ring test piece 102 with the piston material 103 and reciprocating a cast-iron-made round rod 105 provided on an inner surface side of the piston ring test piece 102 in the axial direction thereof, and then the piston material 103 is beaten while rotating the piston ring test piece 102. The testing machine 101 is provided with a heater 104 for heating a material to be tested, and a high temperature condition at a burning time in an engine can be realized without burning fuel, and changes in conditions of the piston material can be monitored.

According to the above attack test with sliding, the wear amount on the piston side and the wear amount on the piston ring side were evaluated. Further, the wear amount was obtained by measuring difference in level by using a surface roughness measuring device. In the measurement, the respective wear amounts were calculated by setting the wear amount of the Comparative Example to "100", and in a case that piston material wear rate and piston ring material wear rate are both less than "90", the evaluation was made as "◎", in a case that the above wear rates are both not less than 95 ahead of 90 the evaluation was made as "○", and in a case that the above wear rates are both not less than 95, the evaluation was made as "X".

These evaluation results are shown in the following Table 1.

TABLE 1

| | | Metal powder | | | Attack test with sliding | | |
| | | Copper system powder containing rate (mass %) | Average particle diameter (μm) | Self-lubricating metal MoS$_2$ Containing rate (mass %) | Test Result | | |
| | | | | | Piston material wear ratio | Piston ring material wear ratio | Total Evaluation |
|---|---|---|---|---|---|---|---|
| Example 1 | Base bottom layer | 0 | — | 2 | 82 | 94 | ○ |
| | Most outside surface layer | 20 | 10 | 2 | | | |
| Example 2 | Base bottom layer | 0 | — | 5 | 80 | 93 | ○ |
| | Most outside surface layer | 20 | 10 | 10 | | | |
| Example 3 | Base bottom layer | 0 | — | 2 | 59 | 94 | ○ |
| | Most outside surface layer | 40 | 10 | 2 | | | |
| Example 4 | Base bottom layer | 5 | 3 | 2 | 62 | 75 | ◎ |
| | Most outside surface layer | 40 | 10 | 2 | | | |
| Example 5 | Base bottom layer | 0 | — | 2 | 79 | 72 | ◎ |
| | Most outside surface layer | 80 | 10 | 2 | | | |
| Example 6 | Base bottom layer | 5 | 10 | 2 | 61 | 89 | ◎ |
| | Most outside surface layer | 40 | 10 | 2 | | | |
| Example 7 | Base bottom layer | 5 | 10 | 2 | 81 | 69 | ◎ |
| | Most outside surface layer | 80 | 10 | 2 | | | |
| Example 8 | Base bottom layer | 20 | 5 | 2 | 78 | 92 | ○ |
| | Most outside surface layer | 30 | 10 | 2 | | | |

TABLE 1-continued

|  |  | Metal powder | | Self-lubricating metal MoS$_2$ Containing rate (mass %) | Attack test with sliding Test Result | | |
|---|---|---|---|---|---|---|---|
|  |  | Copper system powder containing rate (mass %) | Average particle diameter (μm) |  | Piston material wear ratio | Piston ring material wear ratio | Total Evaluation |
| Example 9 | Base bottom layer | 20 | 5 | 5 | 79 | 92 | ○ |
|  | Most outside surface layer | 30 | 10 | 10 |  |  |  |
| Example 10 | Base bottom layer | 40 | 10 | 2 | 84 | 67 | ◉ |
|  | Most outside surface layer | 50 | 10 | 2 |  |  |  |
| Example 11 | Base bottom layer | 40 | 10 | 2 | 94 | 52 | ◉ |
|  | Most outside surface layer | 80 | 10 | 2 |  |  |  |
| Example 12 | Base bottom layer | 0 | — | 5 | 59 | 91 | ◉ |
|  | Most outside surface layer | 40 | 10 | 10 |  |  |  |
| Example 13 | Base bottom layer | 0 | — | 5 | 79 | 71 | ◉ |
|  | Most outside surface layer | 80 | 10 | 10 |  |  |  |
| Example 14 | Base bottom layer | 5 | 10 | 5 | 62 | 88 | ◉ |
|  | Most outside surface layer | 40 | 10 | 10 |  |  |  |
| Example 15 | Base bottom layer | 5 | 10 | 5 | 82 | 68 | ◉ |
|  | Most outside surface layer | 80 | 10 | 10 |  |  |  |
| Example 16 | Base bottom layer | 40 | 10 | 5 | 84 | 66 | ◉ |
|  | Most outside surface layer | 50 | 10 | 10 |  |  |  |
| Example 17 | Base bottom layer | 40 | 10 | 5 | 89 | 51 | ◉ |
|  | Most outside surface layer | 80 | 10 | 10 |  |  |  |

TABLE 1-continued

| | | Metal powder | | Self-lubricating metal MoS$_2$ Containing rate (mass %) | Attack test with sliding Test Result | | Total Evaluation |
|---|---|---|---|---|---|---|---|
| | | Copper system powder containing rate (mass %) | Average particle diameter (μm) | | Piston material wear ratio | Piston ring material wear ratio | |
| Example 18 | Base bottom layer | 0 | — | 5 | 59 | 91 | ○ |
| | Most outside surface layer | 40 | 10 | 10 | | | |
| Example 19 | Base bottom layer | 0 | — | 5 | 79 | 71 | ◎ |
| | Most outside surface layer | 80 | 10 | 10 | | | |
| Example 20 | Base bottom layer | 5 | 3 | 5 | 62 | 88 | ◎ |
| | Most outside surface layer | 40 | 10 | 10 | | | |
| Example 21 | Base bottom layer | 5 | 3 | 5 | 82 | 68 | ◎ |
| | Most outside surface layer | 80 | 10 | 10 | | | |
| Example 22 | Base bottom layer | 40 | 3 | 5 | 84 | 66 | ◎ |
| | Most outside surface layer | 50 | 10 | 10 | | | |
| Example 23 | Base bottom layer | 40 | 3 | 5 | 89 | 51 | ◎ |
| | Most outside surface layer | 80 | 10 | 10 | | | |
| Example 24 | Base bottom layer | 0 | — | 5 | 59 | 91 | ○ |
| | Most outside surface layer | 40 | 10 | 10 | | | |
| Example 25 | Base bottom layer | 0 | — | 5 | 79 | 71 | ◎ |
| | Most outside surface layer | 80 | 10 | 10 | | | |
| Example 26 | Base bottom layer | 5 | 3 | 5 | 62 | 88 | ◎ |
| | Most outside surface layer | 40 | 10 | 10 | | | |

TABLE 1-continued

|  |  | Metal powder | | Self-lubricating metal MoS$_2$ Containing rate (mass %) | Attack test with sliding | | |
|---|---|---|---|---|---|---|---|
|  |  | Copper system powder containing rate (mass %) | Average particle diameter (μm) |  | Test Result | | |
|  |  |  |  |  | Piston material wear ratio | Piston ring material wear ratio | Total Evaluation |
| Example 27 | Base bottom layer | 5 | 3 | 5 | 82 | 68 | ◎ |
|  | Most outside surface layer | 80 | 10 | 10 |  |  |  |
| Example 28 | Base bottom layer | 40 | 3 | 5 | 84 | 66 | ◎ |
|  | Most outside surface layer | 50 | 10 | 10 |  |  |  |
| Example 29 | Base bottom layer | 40 | 3 | 5 | 90 | 51 | ◎ |
|  | Most outside surface layer | 80 | 10 | 10 |  |  |  |
| Comparative Example 1 | Base bottom layer | 20 | 3 | 2 | 100 | 100 | X |
|  | Most outside surface layer | 0 | — | 2 |  |  |  |
| Comparative Example 2 | Base bottom layer | 20 | 10 | 5 | 89 | 97 | X |
|  | Most outside surface layer | 0 | — | 10 |  |  |  |
| Comparative Example 3 | Base bottom layer | 40 | 3 | 5 | 57 | 97 | X |
|  | Most outside surface layer | 0 | — | 10 |  |  |  |
| Comparative Example 4 | Base bottom layer | 40 | 3 | 5 | 69 | 95 | X |
|  | Most outside surface layer | 20 | 10 | 10 |  |  |  |
| Comparative Example 5 | Base bottom layer | 60 | 3 | 5 | 79 | 95 | X |
|  | Most outside surface layer | 20 | 10 | 10 |  |  |  |
| Comparative Example 6 | Base bottom layer | 60 | 3 | 5 | 95 | 95 | X |
|  | Most outside surface layer | 40 | 10 | 10 |  |  |  |

In comparison of the Examples 1-5 with the Comparative Examples 1-3, both shown in the Table 1, it will be confirmed that the Examples of the present invention in which the most outside surface layer contains the metal powders exhibited excellent wear resistance performance, and furthermore, in comparison of the Examples 6-29 with the comparative Examples 4-6, the Examples of the present invention, in which the containing rate of the metal powders contained in the base bottom layer is less than that in the most outside surface layer, exhibited the excellent wear resistance performance. This fact will be apparent from the values of the wear amount ratio of the piston material and the piston ring material.

It is further to be noted that the present invention is not limited to the described embodiment and many other changes and modifications may be made without departing from the scopes of the appended claims.

What is claimed is:

1. A piston ring including a piston ring body and a surface coating film formed on at least one of upper and lower surfaces of the piston ring body, wherein,
the surface coating film comprises a most outside surface layer including a heat-resistant resin and a metal powder contained in the heat-resistant resin and a base bottom layer formed close to the piston ring body and including a heat-resistant resin and the metal powder contained in the heat-resistant resin, in which the base bottom layer includes a metal powder containing rate not more than that contained in the most outside surface layer,
the metal powder is a powder selected from a group consisting of copper system powder, nickel powder, nickel alloy powder, lead system powder, and tin system powder,
the heat-resistant resins forming the base bottom layer and the most outside surface layer further include either one of molybdenum disulfide, tungsten disulfide, or graphite,
the containing rate of the metal powder contained in the base bottom layer is a positive amount not more than 40 mass %,
the containing rate of the either one of molybdenum disulfide, tungsten disulfide, or graphite contained in the base bottom layer is a positive amount not more than 5 mass %,
the containing rate of the metal powder contained in the most outside surface layer is 40 to 80 mass %, and
the containing rate of the either one of molybdenum disulfide, tungsten disulfide, or graphite contained in the most outside surface layer is 2 to 10 mass %.

2. The piston ring according to claim 1, wherein each of the metal powder and the either one of molybdenum disulfide, tungsten disulfide, or graphite contained in the base bottom layer has an average particle diameter of not more than 5 μm, and each of the metal powder and the either one of molybdenum disulfide, tungsten disulfide, or graphite contained in the most outside surface layer has an average particle diameter of 5 to 40 μm.

3. The piston ring according to claim 1, wherein the heat-resistant resins are polyamideimide resin or polyimide resin.

* * * * *